(12) United States Patent
Plocher (10) Patent No.: US 11,797,967 B2
(45) Date of Patent: Oct. 24, 2023

(54) SALES DEVICE FOR SELF-CHECKOUT

(71) Applicant: Bizerba SE & Co. KG, Balingen (DE)

(72) Inventor: Thomas Plocher, Sulz am Neckar (DE)

(73) Assignee: BIZERBA SE & CO. KG, Balingen (DE)

( * ) Notice: Subject to any disclaimer, the term of this patent is extended or adjusted under 35 U.S.C. 154(b) by 410 days.

(21) Appl. No.: 16/677,697

(22) Filed: Nov. 8, 2019

(65) Prior Publication Data

US 2020/0151696 A1     May 14, 2020

(30) Foreign Application Priority Data

Nov. 14, 2018    (EP) .................................... 18206092

(51) Int. Cl.
   *G06Q 20/00* (2012.01)
   *G06Q 20/20* (2012.01)
   *G07G 1/00* (2006.01)

(52) U.S. Cl.
   CPC ......... *G06Q 20/208* (2013.01); *G06Q 20/202* (2013.01); *G07G 1/009* (2013.01); *G07G 1/0072* (2013.01)

(58) Field of Classification Search
   CPC .. G06Q 20/208; G06Q 20/202; G07G 1/0072; G07G 1/009; G07G 1/0036; G07G 1/0081; G07G 1/00
   USPC .......................................................... 705/23
   See application file for complete search history.

(56) References Cited

U.S. PATENT DOCUMENTS

| | | | |
|---|---|---|---|
| 9,773,386 B2 | 9/2017 | Aldahbaj | |
| 11,749,073 | * 9/2023 | Zalewski | G06Q 30/0633 |
| | | | 705/26.8 |
| 2006/0233624 A1 | 10/2006 | Muller et al. | |
| 2014/0214577 A1* | 7/2014 | Acker, Jr. | G01G 19/12 |
| | | | 705/23 |
| 2017/0083887 A1* | 3/2017 | Volta | G06Q 20/208 |
| 2017/0158215 A1* | 6/2017 | Phillips | B60B 19/00 |
| 2018/0060618 A1* | 3/2018 | Ferrer | G06K 7/10356 |
| 2018/0197218 A1* | 7/2018 | Mallesan | G06K 9/00771 |
| 2019/0073656 A1* | 3/2019 | Joseph | G06Q 20/40145 |
| 2019/0236583 A1* | 8/2019 | Hagen | G06Q 20/3224 |
| 2019/0333039 A1* | 10/2019 | Glaser | G06Q 20/208 |

FOREIGN PATENT DOCUMENTS

| | | |
|---|---|---|
| EP | 1717772 A1 | 11/2006 |
| EP | 3147850 A1 | 3/2017 |
| WO | WO 2009066161 A2 | 5/2009 |

* cited by examiner

*Primary Examiner* — Russell S Glass (74) *Attorney, Agent, or Firm* — LEYDIG, VOIT & MAYER LTD (57) ABSTRACT

A sales device allows for self-checkout of goods in a store. The sales device has a controller configured to control the sales device and a communication device configured to receive and send data from and to a network. At least one camera is included that is configured to create an image of at least one view of an open side of a shopping cart or a shopping basket. The sales device also has a support plate that is configured such that the shopping cart or the shopping basket are placeable on it. A detector is included that is configured to detect the shopping cart or shopping basket on the support plate; as is a sensor that is configured to automatically detect a unique identification number of the shopping cart or shopping basket upon the detector detecting the shopping cart or the shopping basket on the support plate.

10 Claims, 5 Drawing Sheets

SALES DEVICE FOR SELF-CHECKOUT

CROSS-REFERENCE TO PRIOR APPLICATIONS

Priority is claimed to European Patent Application No. 18 206 092.1, filed on Nov. 14, 2018, the entire disclosure of which is hereby incorporated by reference herein.

FIELD

The present invention relates to a sales device for self-checkout in a supermarket.

BACKGROUND

U.S. Pat. No. 9,773,386 B2 shows a self-checkout system for a supermarket, in which a customer scans with a hand scanner each item, which he then deposits in a shopping cart. The items are linked to the shopping cart associated with the hand scanner. At checkout, a unique number of the shopping cart is scanned in by the cashier. The shopping cart is linked to the hand scanner; and thus, to the list of items detected by the hand scanner. A list of the items and a corresponding amount to be paid is thus determined by the cashier.

SUMMARY

In an embodiment, the present invention provides a sales device for self-checkout of goods in a store. The sales device has a controller configured to control the sales device and a communication device configured to receive and send data from and to a network. At least one camera is included that is configured to create an image of at least one view of an open side of a shopping cart or a shopping basket. The sales device also has a support plate that is configured such that the shopping cart or the shopping basket are placeable on it. A detector is included that is configured to detect the shopping cart or shopping basket on the support plate; as is a sensor that is configured to automatically detect a unique identification number of the shopping cart or shopping basket upon the detector detecting the shopping cart or the shopping basket on the support plate.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide a sales device, which simplifies the checkout process in a supermarket, and in particular simplifies and automates the process of payment in the case of items scanned by the customer himself.

According to embodiments of the invention, a sales device is provided for the self-checkout of goods in a store. The store is in particular a supermarket. The sales device includes a controller for controlling the sales device. The sales device further includes a communication device for receiving data from a network and sending data to a network. The sales device includes at least one camera for creating an image of at least one view of an open side of a shopping cart or shopping basket. The sales device includes a support plate, which is designed such that the shopping cart or shopping basket can be placed thereon. In the case of a sales device for shopping carts, the shopping cart can be driven onto the support plate. It is thus as flush as possible with the floor and, for example, is located in a floor recess of matching size, or is provided with a small ramp. In the case of a sales device for a shopping basket, the support plate serves as a table at a height which allows an operator to set the basket down on the support plate comfortably and ergonomically. The sales device includes a detector. The detector is designed to detect the presence of a shopping cart or a shopping basket on the support plate. In one embodiment, the detector is a contact switch, a light barrier, an optical system, a laser or ultrasonic distance sensor, a weight sensor, or a magnetic system. The sales device further includes a sensor that determines a unique identification number of the shopping cart or shopping basket. In one embodiment, the unique identification number of the shopping cart or shopping basket is stored on a data medium which is located on the shopping cart or on the shopping basket. In one embodiment, the data medium is a flat plate on which a barcode or QR code is printed, or is an RFID or NFC data medium. In the case of a shopping cart in one embodiment, the data medium is attached to the cart base, to the front of the shopping cart, or to a side wall of the shopping cart. In the case of a shopping basket in one embodiment, the data medium is attached to the bottom or to the side of the shopping basket. The sensor automatically determines the identification number if the detector detects a shopping cart or a shopping basket on the support plate. In one embodiment, the sensor is a barcode scanner, a QR code scanner, or an RFID or NFC reader. In one embodiment, the sensor is an RFID or NFC reader which simultaneously detects the presence of a shopping cart or a shopping basket on the support plate and reads the RFID or NFC data medium on the shopping cart or shopping basket. In this embodiment, detector and sensor are thus realized in a single component.

In one embodiment, the support plate has a rest position for the shopping cart or shopping basket. In the sales device, the sensor is mounted geometrically in relation to the support plate in such a way that the sensor automatically reads the unique identification number from the data medium of the shopping cart or shopping basket as soon as the shopping cart or shopping basket has reached the rest position on the support plate. In other words, if a shopping cart or a shopping basket is located in the rest position on the support plate, sensor and data medium are so close that the sensor can read the data medium. If the data medium is, for example, a barcode or QR code, the sensor will then be located at such a distance from the barcode or QR code that reading the code is possible. If the data medium is an RFID or NFC data medium, the sensor will be located close enough to the data medium to read it.

In one embodiment, the sales device includes scales for weighing a shopping cart or shopping basket. A load plate of the scales is formed by the support plate. The scales determine a weight value if the detector detects a shopping cart or a shopping basket on the support plate. In one embodiment, the scales automatically determine the weight value if the shopping cart or shopping basket is detected by the detector, and/or as soon as the shopping cart or shopping basket reaches the rest position on the support plate. The scales store the weight value in a weight value memory.

In one embodiment, the sales device includes a reading device which reads a weight value from a shopping cart or a shopping basket that is parked or set down on the support plate, and transfers the weight value to the weight value memory. In this embodiment, a shopping cart or a shopping basket has built-in scales and determines the weight value of the items that are located in the shopping cart or shopping basket. In this embodiment, a shopping cart or shopping basket has an electronic data medium, for example an RFID or NFC data medium, on which the weight value is stored. The reading device of the sales device reads the weight value from this data medium. In one embodiment, the reading device is the sensor of the sales device which reads both the weight value and the identification number of the shopping cart or shopping basket.

In one embodiment, the communication device transmits to the network the identification number of the shopping cart or shopping basket, at least one camera image of at least one open side of the shopping cart or shopping basket, and/or the weight from the weight value memory. The communication device receives from the network a release signal associated with the identification number. In one embodiment, the network is designed as an intranet in a supermarket in which the sales device is located, and the identification number and at least one camera image and/or the weight are sent to a server which includes a verification unit and which generates a release signal. In one embodiment, the network is a computing cloud, meaning a cloud network to which the identification number and at least one camera image and/or the weight value are sent and which generates a release signal.

In one embodiment, the sales device includes a payment unit for payment, in particular for cashless payment.

In one embodiment, the sales device includes a release unit. The release unit controls a release indicator that indicates a release if a release signal associated with the identification number has been received from the network. The release indicator indicates no release if a release signal associated with the identification number has not been received. In one embodiment, the release indicator is indicated on the payment unit.

In one embodiment, the release unit controls a two-stage release indicator. The first stage of the release indicator indicates a release if a release signal associated with the identification number has been received from the network. The first stage of the release indicator indicates no release if a release signal associated with the identification number has not been received. The second stage of the release indicator indicates a release if a payment transaction has been successfully concluded. The second stage of the release indicator indicates no release if a payment transaction has not been successfully concluded. At least one of the two release indicators is indicated on the payment unit. In one embodiment, the payment unit is a terminal for cashless payment by means of credit card or EC card. After successful electronic payment, the conclusion of the transaction is indicated on the payment unit. In one embodiment, the payment unit is a mobile payment device, for example with a smartphone and a corresponding app. In one embodiment, an app on the smartphone allows both scanning of the products during shopping and mobile payment.

In one embodiment, the release is indicated by a lamp illuminating. The no-release is indicated by the lamp not illuminating. In one embodiment, release and no-release are indicated by symbols or text on a control panel, display device, or input/output device of the sales device or payment unit.

In one embodiment, the sales device includes grippers that automatically fix the shopping cart or shopping basket on the support plate if the shopping cart or shopping basket in the sales device is detected by the detector. In one embodiment, the grippers fix the shopping cart or shopping basket in the rest position on the support plate. The grippers only release the shopping cart or shopping basket if the release unit has received from the network a release signal corresponding to the identification number, and/or if the payment unit has determined that a payment transaction has successfully ended.

According to an embodiment of the invention, a system is provided for the self-checkout of goods in a store. In one embodiment, the store is a supermarket. The system includes a plurality of shopping carts and/or shopping baskets. The system further includes at least one sales device according to an embodiment of the invention. Each sales device is connected to a network via its communication device. In one embodiment, the network is a computing cloud, thus a cloud network. In one embodiment, the network is a local area network of the store. In one embodiment, the network is a public network. The network includes a verification unit that generates a release signal if a list of goods associated with an identification number sent by the sales device agrees with associated images and weight values transmitted from the sales device. The goods that an operator selects while shopping in the store are scanned with the aid of a mobile terminal. In one embodiment, the mobile terminal is a smartphone with a corresponding app. This mobile terminal sends the information about the scanned goods, individually or as a list, to the verification unit via a network. A list of goods which need to be in the shopping cart or shopping basket is thus generated. In one embodiment, the network is a mobile communications network in which the smartphone is registered.

According to an embodiment of the invention, a method is provided for operating a sales device for self-checkout in a store, in particular in a supermarket. In one step, a shopping cart or shopping basket on a support plate is detected by a detector. In a further step, a unique identification number of the shopping cart or shopping basket is determined with a sensor. In one embodiment, the two steps are executed simultaneously, in particular with the same sensor. In a further step, at least one image of at least one view of an open side of the shopping cart or shopping basket is created with a camera. In a further step, a communication device sends to a network the unique identification number and the at least one image of the at least one open side of the shopping cart or shopping basket. In one embodiment, the network is a computing cloud, meaning a cloud network. In one embodiment, the network is a local area network. In one embodiment, the network is a public network. In a further step, the communication device receives from the network a release signal associated with the unique identification number. The method has the advantage that the recognition and verification of the content of the shopping cart or shopping basket takes place automatically. The operator does not need to register the shopping cart or shopping basket with the sales device. Nor does he need to synchronize the product scanner with the sales device. The method is thus not error-prone and is time-efficient.

In one embodiment, the method includes the automatic determination of a weight value of the shopping cart or shopping basket with scales whose load plate is the support plate.

In one embodiment, the method includes the reading of a weight value from a data medium of the shopping cart or shopping basket which has been placed onto the support plate.

In one embodiment, the method includes the indication of a release with a two-stage release indicator, where the first stage of the release indicator indicates a release if a release signal associated with the identification number has been received from the network, and the first stage of the release indicator indicates no release if a release signal associated with the identification number has not been received. The second stage of the release indicator indicates a release if a payment transaction has been successfully concluded, and the second stage of the release indicator indicates no release if a payment operation has not been successfully concluded. In one embodiment, the method includes indicating a release with a simple release indicator that indicates only the first stage.

In one embodiment, the method includes automatically fixing the shopping cart or shopping basket on the support plate with grippers. The shopping cart or shopping basket is in particular fixed in a rest position on the support plate. In one step, the shopping cart or shopping basket is released by the grippers if the release unit has received from the network a release signal associated with the identification number. In one embodiment, the shopping cart or shopping basket is only released if the release unit has received from the network a release signal associated with the identification number, and if the payment unit has determined that a payment transaction has been successfully concluded.

Figure 1:
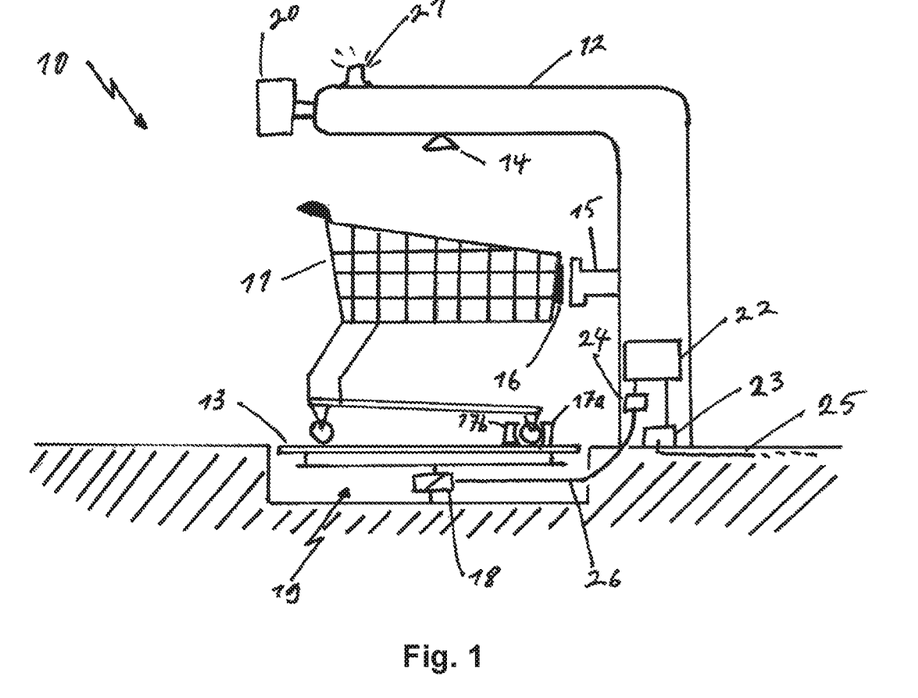
FIG. 1 illustrates a sales device according to a first embodiment of the invention for a shopping cart.

FIG. 1 shows a sales device 10 according to the invention, in a first embodiment. The sales device 10 includes a frame 12 beneath which a shopping cart 11 can be pushed. Beneath the frame 12, the shopping cart 11 has a defined position (rest position) on a support plate 13. The support plate 13 is a load plate of scales and is mechanically connected to the force introduction side of one or more weighing cells 18. The scales determine the total weight of the shopping cart 11 with its contents. The frame 12 further includes at least one camera 14 that is designed to create at least one image of a view of an open side of the shopping cart 11. Given a shopping cart 11, the top side is normally open. However, an open side in the sense of this disclosure is also, for example, a side part of the shopping cart which consists of transparent material. Within the scope of the invention, it shall also be deemed an open side if the shopping cart consists of a wide-meshed metal grid through which an image capture of the content of the shopping cart can be made. Within the scope of this disclosure, it is not to be deemed an open side if the side of a shopping cart consists of non-transparent plastic or is concealed by a non-transparent advertising panel. The frame 12 includes a sensor 15 which determines a unique identification number of the shopping cart 11. The unique identification number is fixedly attached to a data medium 16 of the shopping cart 11. If the data medium 16 is, for example, a flat plate to which a barcode or QR code is applied, the sensor 15 is a barcode reader or QR code reader and, if the shopping cart 11 is in the rest position, is located at a distance from the barcode or QR code which permits reading the code. If the data medium 16 is an RFID or NFC data medium, the sensor 15 is an RFID reader or NFC reader and is located close enough to the data medium 16 to read it if the shopping cart is located in the rest position. The frame 12 includes a detector which detects the presence of a shopping cart 11. Both the sensor 15 and the weighing cell 18 can serve as a detector. Furthermore, the detector can be designed as a separate detector such as a light barrier, for example. The sales device 10 includes grippers 17a, 17b which automatically fix the shopping cart on the support plate 13 and keep it in the rest position as soon as the detector detects a shopping cart on the support plate 13. The weighing cell 18 is connected to a weight value processing device 24 which determines a weight value of the shopping cart 11 from the signals of the weighing cell 18 or weighing cells 18. The weight value processing device 24 includes a weight value memory for storing the weight value. The at least one camera 14, the sensor 15, and the weight value processing device 24 are connected to a controller 22 and pass the determined data to the controller 22. The controller 22 is connected to a communication device 23 via which the controller 22 transmits to a network 25 data such as images, identification number, and weight and receives from the network 25 at least one release signal. The sales device includes an input/output unit 20 with which an operator can interact with the sales device 10. The input/output unit 20 likewise includes a payment unit at which preferably cashless payment can be made. On the input/output unit 20, a first release indicator indicates a release if a release signal associated with the identification number is received from the network 25. The network sends such a release signal if the data sent from the communication unit 23 into the network 25, the data consisting of weight, one or more images of open sides of the shopping cart 11, and identification number, could be verified in a verification process executed in the network 25, 63, for example in a cloud network (computing cloud) 25, 63. The input/output unit 20 indicates a release with a second release indicator if a payment operation has been successfully concluded. If the aforementioned conditions are not met, the corresponding first and/or second release indicator will not be indicated, or these release indicators indicate no release. The release unit is part of the controller 22. The indication of the first and/or second release indicator can additionally or alternatively also be indicated by a release indicator device 21, for example in the form of a light signal. The release indicator device 21 is mounted on the frame 12. If there has been both a successful verification in the network 25, 63 and a successful payment transaction, simultaneously with indication of the second release indicator the controller 22 will open the grippers 17a, 17b and release the shopping cart 11 again. As of this point in time, the operator can pull the shopping cart 11 out from underneath the frame 12 and leave the supermarket. Holding the shopping cart 11 beneath the frame 12 by means of the grippers 17a, 17b leads to the situation that the customer does not mistakenly pushing the shopping cart 11 towards the exit of the supermarket as long as the verification process or the payment transaction has not yet been concluded.

Figure 2A:
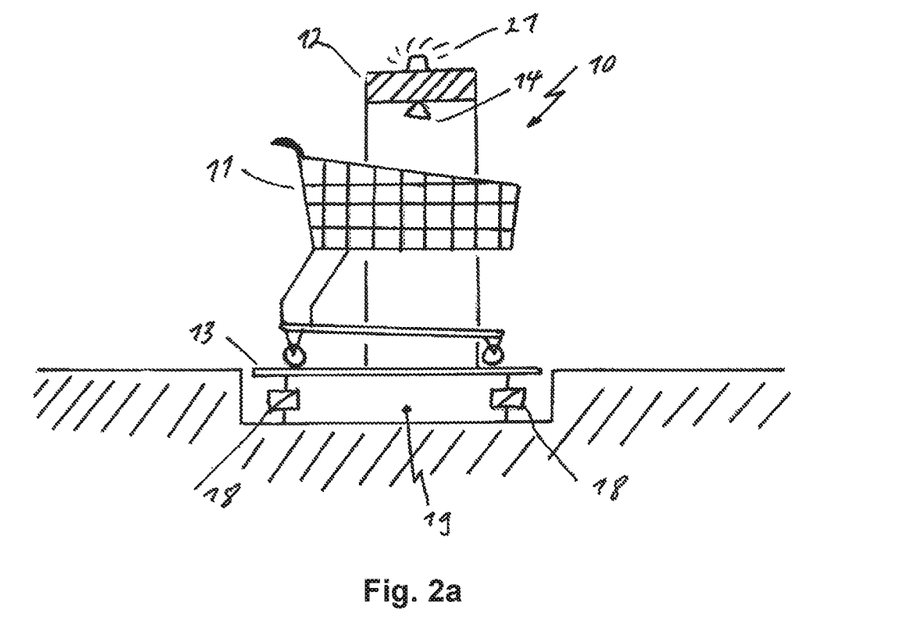
FIGS. 2a and 2b illustrate a sales device according to a second embodiment of the invention for a shopping cart.
Figure 2B:
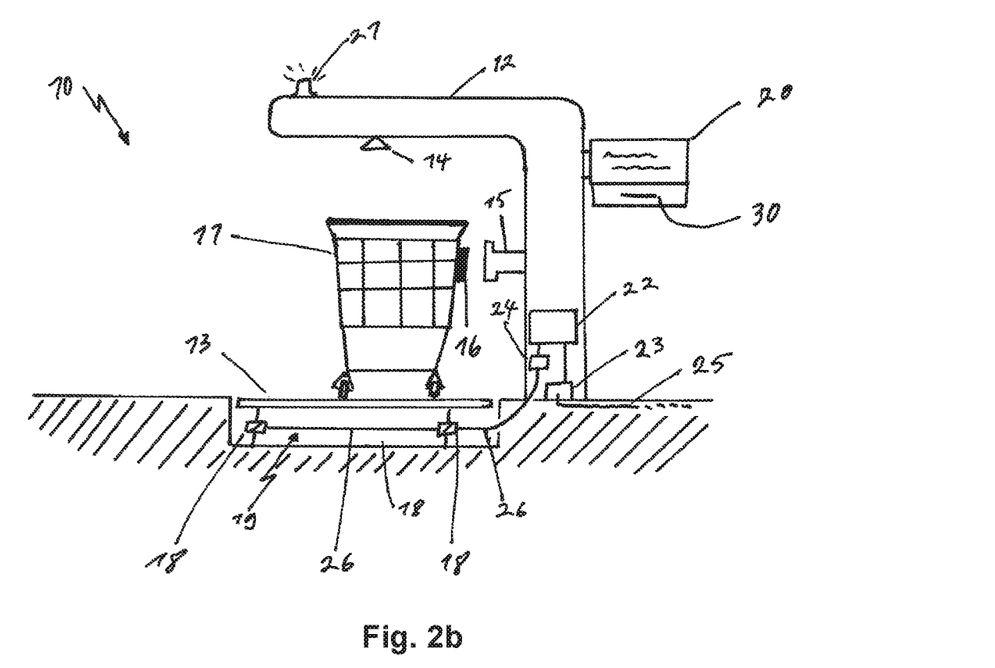

Whereas FIG. 1 shows a sales device 10 in which the shopping cart 11 is pushed forward beneath the frame 12 and is drawn backward from under the frame 12 after completion of the payment transaction, FIGS. 2a and 2b show a first view and a second view of a sales device 10 in a second embodiment, in which the shopping cart 11 is pushed through beneath the sales device 10. The frame 12 projects laterally over the shopping cart 11. The sales device 10 shown in FIGS. 2a and 2b is a transit arrangement. In order to avoid repetition, in the description of the second embodiment below, only the differences in comparison to the first embodiment will be discussed. For the other features, refer to the description regarding FIG. 1.

FIGS. 2a and 2b show by way of example that the support plate 13 is supported on four weighing cells 18. This gives the support plate 13 more stability and ensures a more accurate weighing result. The person skilled in the art understands that the first embodiment can also be realized with four weighing cells 18, and that the second embodiment can also be realized with only one weighing cell 18. In the second embodiment, the data medium 16 is mounted on the side of the shopping cart 11 so that, insofar as the shopping cart 11 is located in the rest position, it has a defined distance from the sensor 15. The input/output unit 20 is mounted on the side of the frame 12, as shown in FIG. 2b. The payment unit 30 is integrated into the input/output unit 20. The operator pushes the shopping cart 11 laterally beneath the frame 12, and the input/output unit 20 is then in an ergonomic position for the operator. For the sake of clarity, no grippers are shown in FIGS. 2a and 2b, it being understood by the person skilled in the art that the grippers can be mounted on the support plate just as in the first embodiment. An alternative possibility for defining a rest position is, for example, a stop at the end of the support plate 13 in the direction of travel, which stop is part of the support plate 13 and can be extended and lowered via the support plate. When the stop is extended, the operator pushes the front wheels of the shopping cart up to the stop. By being lowered below the height of the support plate 13, the stop only releases further travel of the shopping cart 11 when both verification and payment transaction have been successfully concluded. If the grippers 17a, 17b or the stop are integrated into the support plate 13, no force shunting can occur, and no disadvantages arise in the weight determination.

Figure 3A:
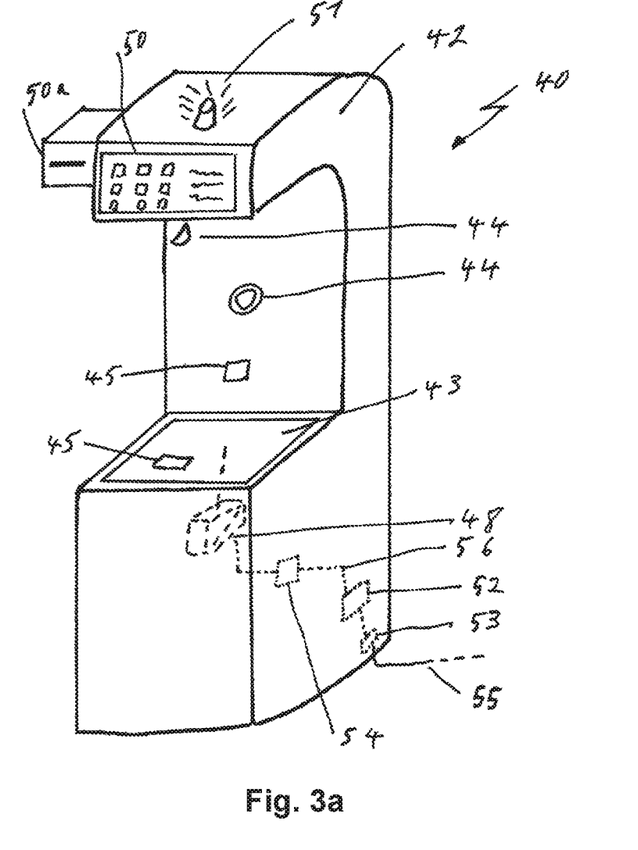
FIG. 3a illustrates a sales device according to a third embodiment of the invention for a shopping basket.
Figure 3B:
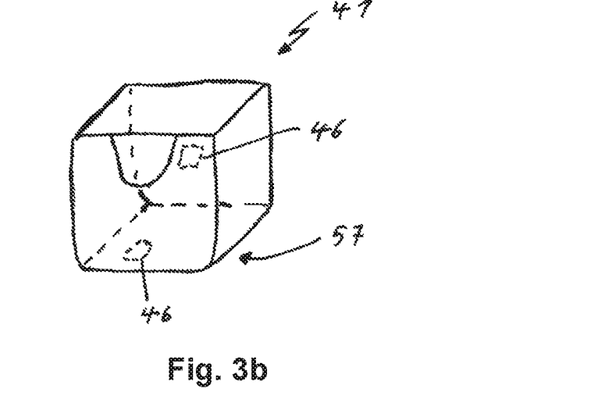
FIG. 3b illustrates a shopping basket for a sales device according to an embodiment of the invention.

FIG. 3a shows a sales device 40 in a third embodiment. This embodiment is suitable for verifying the content of a shopping basket 41 (FIG. 3b). A frame 42 is designed in such a way that it forms a support for the shopping basket 41, which support is not located down on the floor but rather at an ergonomic height for the operator. The frame 42 includes an upper part which projects over the parked shopping basket 41. In the frame, a support plate 43 is formed on which the shopping basket 41 with its underside 57 can be placed. The frame 42 holds at least one camera 44 which is positioned such that it can make an image of the content of the shopping basket 41 from an open side of the shopping basket 41. The sales device 40 further includes a sensor 45 which is mounted in the frame 42 or in the support plate 43 and reads a unique identification number from a data medium 46 on the shopping basket 41.

The sales device 40 includes scales. The support plate 43 forms the load plate of the scales and is mechanically connected to the force introduction side of a weighing cell 48 accommodated in the frame 42. The weighing cell 48 is connected to a weight value processing device 54 which determines a weight value of the shopping basket 41 from the signals of the weighing cell 48 and stores the weight value in a weight value memory. In this embodiment as well, the support plate 43 can be supported by a plurality of weighing cells 48. Since a shopping basket 41 is not as heavy or as large as a shopping cart 11, and the support plate 43 is correspondingly smaller than in the first two embodiments, in a preferred embodiment one weighing cell 48 is sufficient for weight determination. The weight value processing device 54 passes the weight value to a controller 52, which for its part is connected to a communication device 53. The controller 52 controls the processes in the sales device 40. The communication device 53 is connected to a network 55. The upper part of the frame 42 includes an input/output unit 50. The input/output unit 50 can be integrated into the housing of the frame 42 and is a touchscreen, for example. A payment unit 50a is mounted on the frame. The payment unit 50a can also be integrated into the input/output unit 50. The payment unit 50a serves for cashless payment at the sales device 40. In addition, a release indicator device 51 is mounted on the upper side of the frame 42. The indication of the first and/or second release indicator can, for example, be indicated in the form of a light signal.

Figure 4:
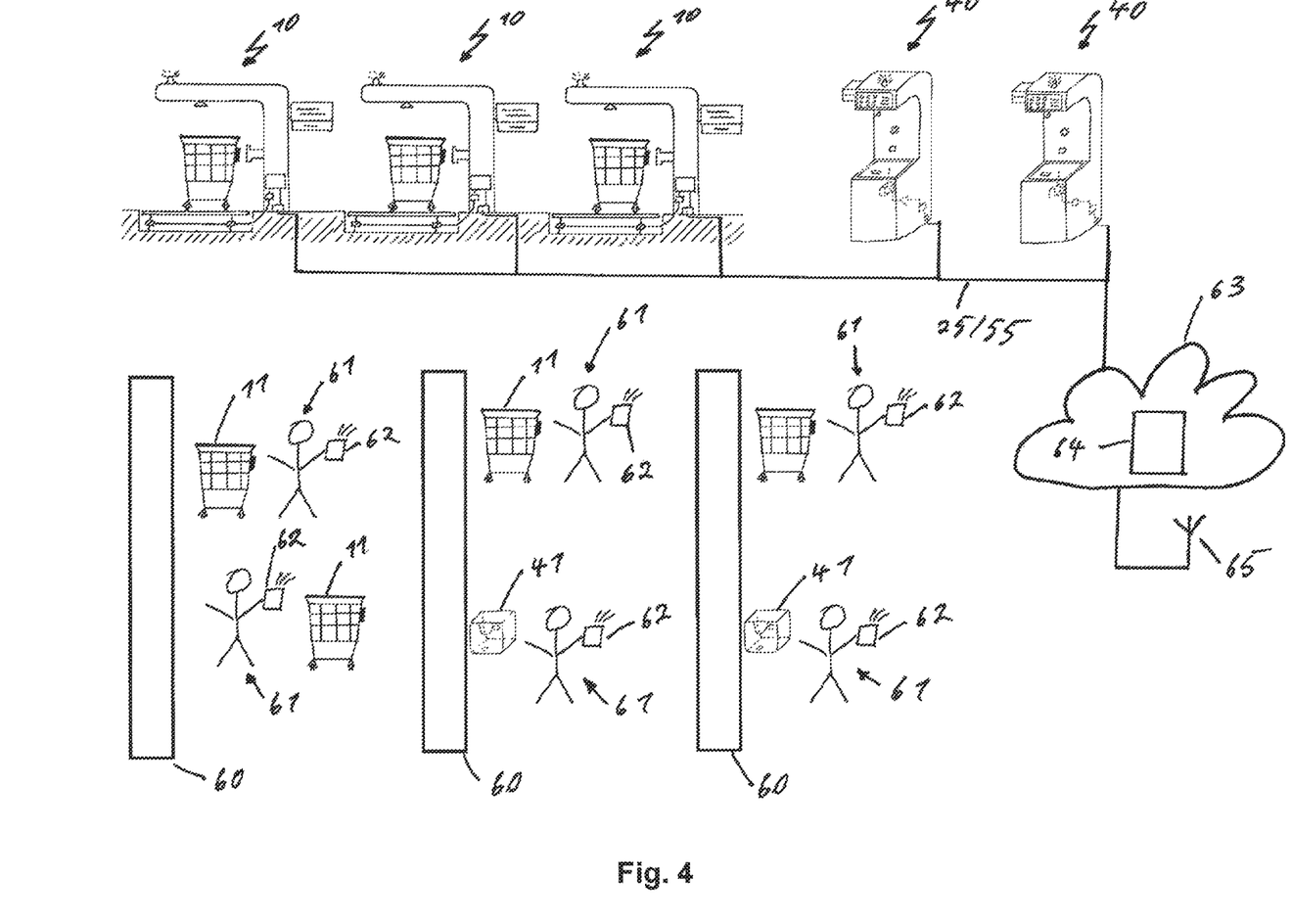
FIG. 4 illustrates a system for self-checkout in a store.

FIG. 4 shows a system for self-checkout in a supermarket. In a supermarket, a plurality of customers 61 are present who themselves become operators during self-checkout at the sales devices 10, 40. The customers 61 go with a shopping cart 11 or a shopping basket 41 to the shelves 60 in order to take products and put them in their shopping cart 11 or shopping basket 41. Each customer thereby has in hand a product scanner 62 with which he scans each product before putting it in the shopping cart 11 or shopping basket 41. Each product scanner 62 wirelessly transmits to a network 63 each scanned product and an identification number of the shopping cart 11 or shopping basket 41 associated with the product scanner 62. Both product scanner 62 and network 63 are able to communicate wirelessly with one another. In one embodiment, the product scanner 62 and the network 63 are a local area network with an adapted product scanner 62. In one embodiment, the product scanner 62 is a smartphone on which a corresponding app is running. The smartphone 62 is connected to the network 63 via a mobile communications network 65 or a WLAN of the supermarket 65. In one embodiment, the network 63 is a computing cloud, meaning a cloud network. The supermarket includes one or more sales devices 10 suitable for a self-checkout with a shopping cart 11, these being shown in detail in FIGS. 1, 2a, and 2b. The supermarket alternatively or additionally includes one or more sales devices 40 that are suitable for self-checkout with a shopping basket 41, these being shown in detail in FIG. 3. The sales devices 10, 40 are connected to the computing cloud 63 via a network 25, 55. The computing cloud 63 includes a verification unit 64 which receives, transmitted from the sales device 10, 40 via the network 25, 55, images and weight values belonging to an identification number of a shopping cart 11 or a shopping basket 41. Regarding this identification number, the computing cloud 63 has a list of products which should be located in the shopping cart 11 or shopping basket 41, the list being transmitted from the corresponding product scanners 62 via the wireless network 65. The verification unit 64 checks images and weight values associated with a certain identification number against a list of products associated with that identification number. In this instance, a check is made as to whether each product, which can be concluded on the basis of the images and the weight values, is also located on the list of products. In other words, a plausibility test is made in the verification unit 64 as to whether the customer 61 has scanned all of the products. If this is the case, the verification unit 64 generates a release signal which is transmitted via the network 25, 55 to the corresponding sales devices 10, 40.

Figure 5:
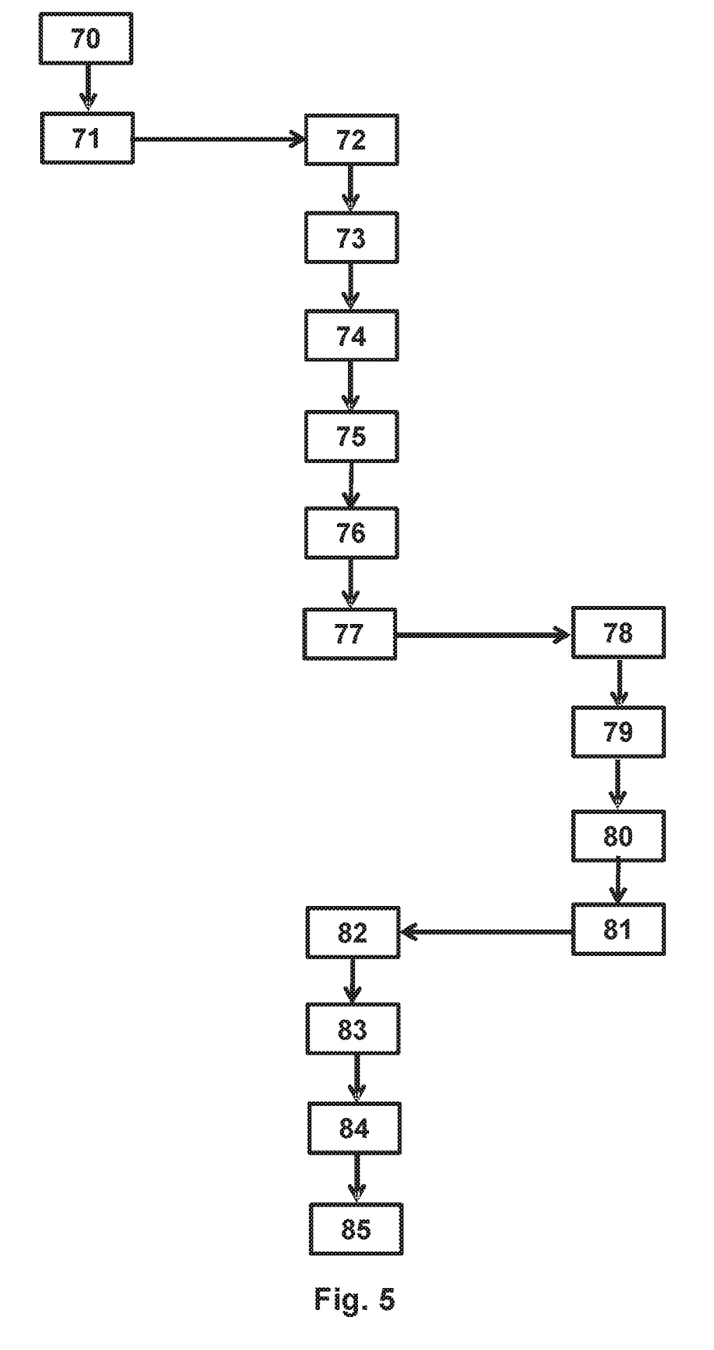
FIG. 5 illustrates a first method for operating a sales device according to an embodiment of the invention.

FIG. 5 shows in schematic form a method for self-checkout in a supermarket. The method steps are executed partly by the customer, partly by a sales device 10, 40 according to the invention, and partly in an associated network 63, in particular in a computing cloud 63. The steps on the left side are executed by the customer during shopping. The steps in the middle are executed by the sales device 10, 40. The steps on the right side are executed by the computing cloud 63.

During self-checkout in a supermarket, the customer is responsible for taking his purchases from the shelves 60 himself; scanning them, meaning handling the products himself; and, to complete his shopping, verifying and paying for the products at a sales device 10, 40 for self-checkout himself. The supermarket can thus forego cashier staff. The customer replaces the cashier staff and is thus himself an operator of the self-checkout sales device 10, 40. In a first step 70, a customer takes a shopping cart 11 or shopping basket 41 and scans its identification number with a product scanner 62. The customer thus associates a shopping cart 11 or shopping basket 41 with his product scanner 62. In one embodiment, the product scanner 63 is an RFID- or NFC-enabled smartphone, and the data medium 16, 46 on the shopping cart 11 or shopping basket is an RFID or NFC data medium. The scanning process in step 70 takes place with this technology. In one embodiment, the data medium is a plate with a barcode or QR code, and the scanning process takes place optically via the smartphone camera.

All products scanned with this product scanner 62 during the sales process are associated with the identification number of the shopping cart 11 or shopping basket 41. In step 71, the customer goes through the supermarket and takes the products he wants from the shelves 60. With the product scanner 62, the customer scans each product he removes from the shelves 60 and then puts in his shopping cart 11 or shopping basket 41. The product scanner 62 transmits the scanned products respectively via a wireless network 65. A list of scanned products is created in the network, in particular in the computing cloud 63, and associated with the corresponding product scanner 62 and the identification number associated therewith. As soon as a customer has collected all the products he would like to purchase, he goes to a sales device 10, 40. He pushes the shopping cart 11 onto the support plate 13 of the sales device 10, or sets the shopping basket 41 down on the support plate 43 of the sales device 40. In step 72, the sales device 10, 40 automatically detects the shopping cart 11 or shopping basket 41. In an optional step 73, the sales device 10, 40 automatically fixes the shopping cart 11 or the shopping basket 41 with grippers 17a, 17b. In step 74, the sales device 10, 40 with a sensor 15, 45 automatically determines the unique identification number of the shopping cart 11 or shopping basket 41. In step 75, the sales device 10, 40 automatically creates at least one image, with at least one camera 14, 44, of at least one open side of the shopping cart 11 or shopping basket 41. In step 76, the weight of the shopping cart 11 or shopping basket 41 is determined with a weighing cell 18, 48 and an associated weight value processing device 24, 54. Steps 74 to 76 may be executed concurrently. Their order can also be changed. In step 77, via a network 25, 55 the sales device 10, 40 sends the identification number, the created images, and the determined weight value to a network, in particular to a computing cloud 63. In step 78, the computing cloud 63 receives the transmitted data. A product list associated with the identification number has been created in the computing cloud 63 during step 71, and in step 79 the product list is read from the memory of the computing cloud 63 by the verification unit 64. In step 80, the purchase is verified in the verification unit 64 of the computing cloud 63. This means that the product list with the products which would need to be expected in the shopping cart 11 or shopping basket 41 is compared with the received images and with the weight value. The verification unit 64 thereby detects whether any products that are not on the product list are located in the shopping cart 11 or shopping basket 41. If a discrepancy is detected, an error message is generated which is sent to the sales device in step 81, and the self-checkout process must be terminated, and the checkout process must be continued with the aid of a supermarket employee. The verification unit sends a no-release for this purpose. However, if the verification unit 64 confirms in step 80 that the product list, the images, and the weight value associated with an identification number agree, in step 81 the verification unit 64 sends a release signal to the sales device 10, 40 via the network 25, 55. In step 82, the sales device 10, 40 receives a release signal from the computing cloud 63. The sales device 10, 40 indicates the release to the operator in step 83 and starts the payment process in step 84. If the payment transaction has been successfully concluded, the sales device 10, 40 will indicate a second release and optionally releases the shopping cart 11 or shopping basket 41 from the grippers. The customer is then able to leave the supermarket with his purchase.

In one embodiment, in step 71 not every scanned item is sent over the network 65 to the computing cloud 63. The list of scanned items is created in the product scanner 62. As soon as the identification number is received in the computing cloud 63 in step 78, in step 79 the computing cloud 63 requests and receives the complete list from the product scanner 62 via the network 65.

The functions of various elements shown in the drawings, including the functional blocks, may be realized by dedicated hardware or by generic hardware capable of executing software in conjunction with the corresponding software. If the functions are provided by means of a processor, they may be provided by a single dedicated processor, a single shared processor, or a plurality of generic processors which may in turn be shared. The functions may be provided, without limitation, by a digital signal processor (DSP), network processor, application-specific integrated circuit (ASIC), field programmable gate array (FPGA), read-only memory (ROM) with stored software, random access memory (RAM), and nonvolatile memories.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A system for self-checkout of goods in a store, the system comprising:
    a plurality of shopping carts or shopping baskets each having a respective unique identifier; and
    at least one sales device for self-checkout of goods in the store, the sales device comprising:
        a controller configured to control the sales device;
        a communication device configured to receive and send data from and to a network;
        a support plate which is configured such that a placed shopping container, which is one of the shopping carts or the shopping baskets, is placeable on it;
        a detector configured to detect the placed shopping container on the support plate;
        a scale comprising a load plate, the scale being configured to weigh the placed shopping container, the load place comprising the support plate,
        at least one camera configured to create an image of at least one view of an open side of the placed shopping container; and
        a sensor configured to automatically detect the unique identification number associated with the placed shopping container upon the detector detecting that the placed shopping container is on the support plate;
    wherein the scale is configured to determine a weight value, upon the detector detecting that the placed shopping container is on the support plate, and is further configured to transmit the weight value to a weight value memory;
    wherein the communication device is configured to transmit to the network the unique identification number of the placed shopping container and the image and the weight of the placed shopping container, the image and the weight being of the placed shopping container in a state where one or more goods are in the placed shopping container,
    wherein the network comprises a verification unit configured to generate a release signal based upon a list of goods associated with the unique identification number sent by the sales device corresponding to the image and the weight value transmitted by the sales device;
    wherein the verification unit is configured to receive, via the network, information about goods scanned by an operator with the aid of a mobile terminal, the information about the goods being received individually or as a list to generate the list of goods which need to be in the placed shopping container and need to be associated with the unique identification number; and
    wherein the sales device is further configured to receive from the network a release signal associated with the unique identification number.

2. The system according to claim 1, wherein the support plate has a rest position for the placed shopping container, and the sensor is mounted and positioned geometrically in relation to the support plate such that the sensor is positioned to automatically read the unique identification number from a data medium on the placed shopping container as soon as the placed shopping container has reached the rest position on the support plate.

3. The system according to claim 1, wherein the sales device comprises a payment unit for processing payment.

4. The system according to claim 1, wherein the sales device comprises a release unit that is configured to control a release indicator, the release indicator indicating a release based upon receiving the release signal associated with the unique identification number from the network, and indicating no release based upon not receiving the release signal associated with the unique identification number, and wherein the release indicator is indicated on a payment unit.

5. The system according to claim 1,
    wherein the sales device comprises a release unit,
    wherein the release unit is configured to control a two-stage release indicator,
    wherein the first stage of the two-stage release indicator indicates a release based upon receiving the release signal associated with the unique identification number from the network, and the first stage indicates no release based upon not receiving the release signal associated with the unique identification number; and the second stage of the two-stage release indicator indicates the release based upon successful conclusion of a payment transaction, and the second stage of the release indicator indicates no release based upon an unsuccessful conclusion of the payment transaction, and
    wherein at least one of the first stage or the second stage of the two-stage release indicator is indicated on a payment unit.

6. The system according to claim 1,
    wherein the sales device comprises grippers configured to automatically fix the placed shopping container on the support plate based upon the placed shopping container being detected in the sales device by the detector; and
    wherein the grippers are configured to only release the placed shopping container based upon a release unit having received from the network the release signal associated with the unique identification number, and/or based upon a payment unit having determined a successful ending of a payment transaction.

7. A method for operating a system for self-checkout in a store, the system comprising a sales device, a plurality of shopping carts or shopping baskets each having a respective unique identifier, a network, and a mobile terminal used by an operator, the method comprising:
    detecting, by the sales device, a placed shopping container, which is one of the shopping carts or shopping baskets, on a support plate, the placed shopping container comprising a plurality of goods,
    determining, by the sales device, the unique identification number associated with the placed shopping container based upon detecting that the placed shopping container is on the support plate,
    creating, by the sales device, an image of at least one view of an open side of the placed shopping container in a state where the shopping container comprises the goods,
    determining, by a scale comprising a load plate, a weight value of the placed shopping container in the state where the shopping container comprises the goods, the determining being upon detecting that the placed shopping container is on the support plate, the load plate comprising the support plate, sending, by the sales device, to the network the unique identification number, the weight value, and the image of the at least one open side of shopping container, receiving, by a verification unit via the network, information about goods scanned by the operator with the aid of the mobile terminal to generate a list of goods which need to be in the placed shopping container and need to be associated with the unique identification number, generating, by the verification unit, a release signal based upon the list of goods corresponding with the image and the weight value, and receiving, by the sales device, from the network the release signal associated with the unique identification number.

8. The method according to claim 7, wherein the method further comprises the following steps:

indicating a release with a two-stage release indicator, wherein a first stage of the release indicator indicates the release if the release signal associated with the unique identification number has been received from the network, and the first stage of the release indicator indicates no release if the release signal associated with the unique identification number has not been received; and a second stage of the release indicator indicates the release if a payment transaction has been successfully concluded, and the second stage of the release indicator indicates no release if the payment transaction has not been successfully concluded.

9. The method according to claim 7, wherein the method further comprises the following steps:

automatically fixing the placed shopping container on the support plate with grippers, releasing the placed shopping container via the grippers if a release unit has received from the network the release signal associated with the unique identification number.

10. The method according to claim 9, the release signal being generated further based upon a payment unit determining a successful ending of a payment transaction.

* * * * *